Dec. 28, 1943.   P. A. ASTRADSSON   2,338,018
DEVICE FOR TRANSMISSION OF HEAT
Filed March 30, 1940   3 Sheets-Sheet 1
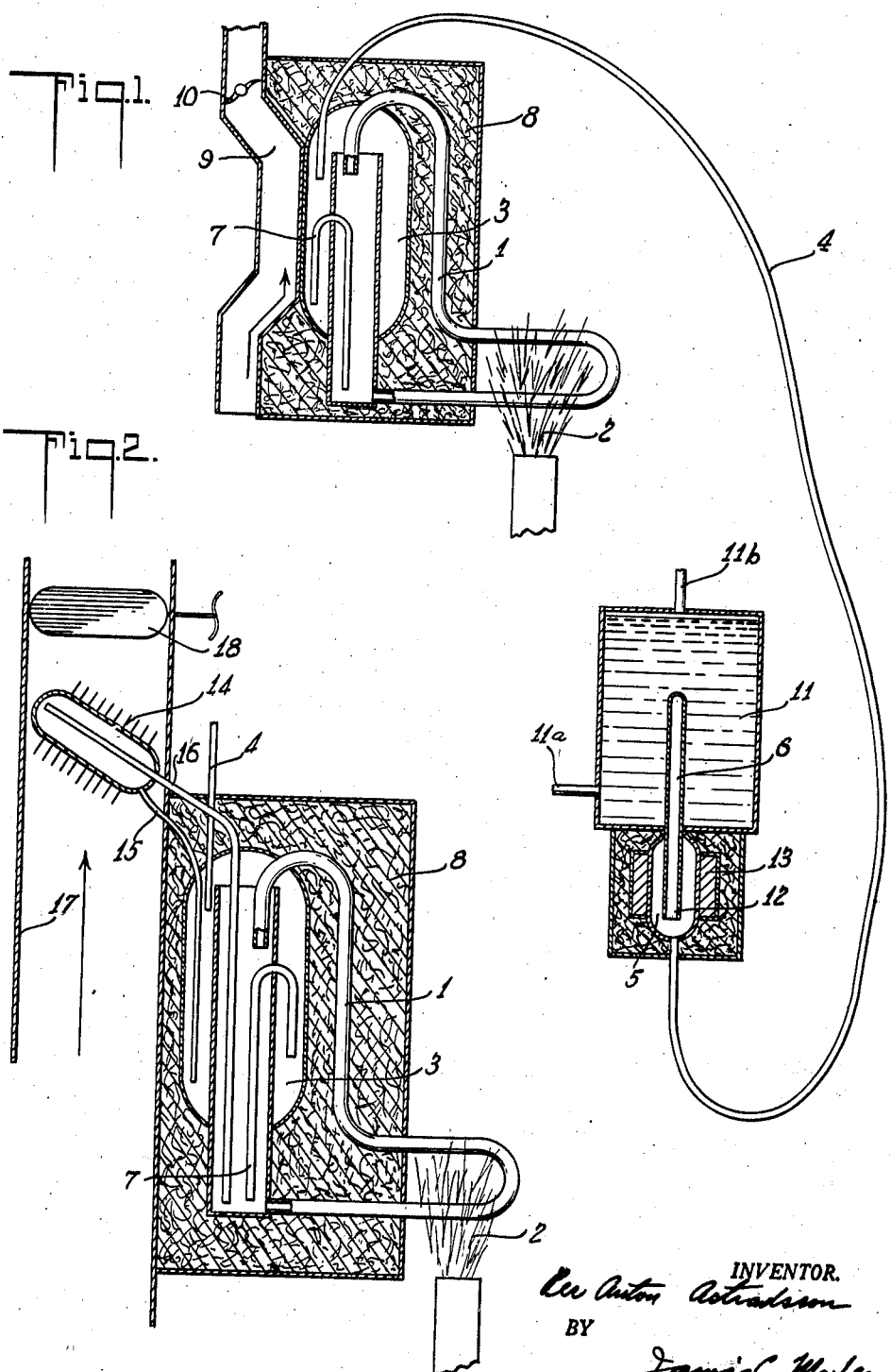
INVENTOR.
Per Anton Astradsson
BY
James C. Mackey
his ATTORNEY Dec. 28, 1943.  P. A. ASTRADSSON  2,338,018
DEVICE FOR TRANSMISSION OF HEAT
Filed March 30, 1940  3 Sheets-Sheet 2

INVENTOR.
Per Anton Astradsson
BY
James C. Marble
his ATTORNEY

Dec. 28, 1943.  P. A. ASTRADSSON  2,338,018
DEVICE FOR TRANSMISSION OF HEAT
Filed March 30, 1940  3 Sheets-Sheet 3

INVENTOR.
BY
ATTORNEY

Patented Dec. 28, 1943

2,338,018

UNITED STATES PATENT OFFICE 2,338,018

DEVICE FOR TRANSMISSION OF HEAT

Per Anton Åstradsson, Stockholm, Sweden, assignor to Svenska Aktiebolaget Gasaccumulator, Stockholm, Sweden, a corporation of Sweden Application March 30, 1940, Serial No. 327,074
In Sweden April 22, 1939

12 Claims. (Cl. 122—4)

For transmission of heat it is hitherto known to use heat transmitting devices, in which heat is transmitted from a heat emitting part to a heat consuming part by means of a vaporizable heat transmitting medium, circulating in a circulation system, continuously vaporizing at the first point, condensating at the latter, and flowing back under the influence of gravity to the first point. Such devices have several disadvantages. To make them function it is thus necessary that the heat consuming part should be situated higher than the heat emitting part, and that the circulation system should be provided with a continuously inclined conduit, connecting these two parts. It is also necessary that this conduit should either consist of a wide pipe, in which liquid and vapour are able to pass simultaneously in opposite directions, or of two pipes, one for vapor and one for condensate. These disadvantages are eliminated by the present invention in such a way, that the heat transmitting medium, through one and the same conduit, is forced alternately to and fro between a heat absorbing part of the circulation system and a heat emitting part of same under the influence of the differences in vapour pressure, produced in the circulation system. In this way, a single small bore pipe only is required for connecting the heat absorbing part of the system with the heat emitting part of same. The emission of heat from the heat emitting part, which, according to the invention is alternately obtained and interrupted, may also be made so distinctly periodical, that the method and the device as per the invention may be useful for transmission of heat to intermittently operating absorption-refrigerating systems, whereby the arrangements, otherwise necessary for starting and stopping the boiler of the absorption-refrigerating system, are avoided.

Figure 3:
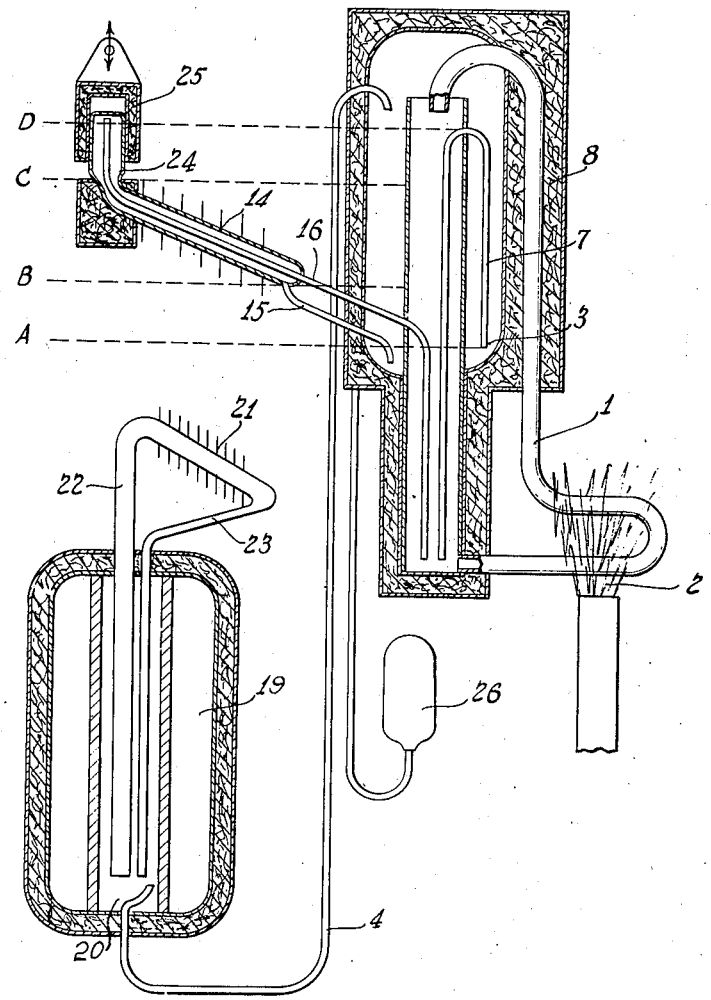
Figure 4:
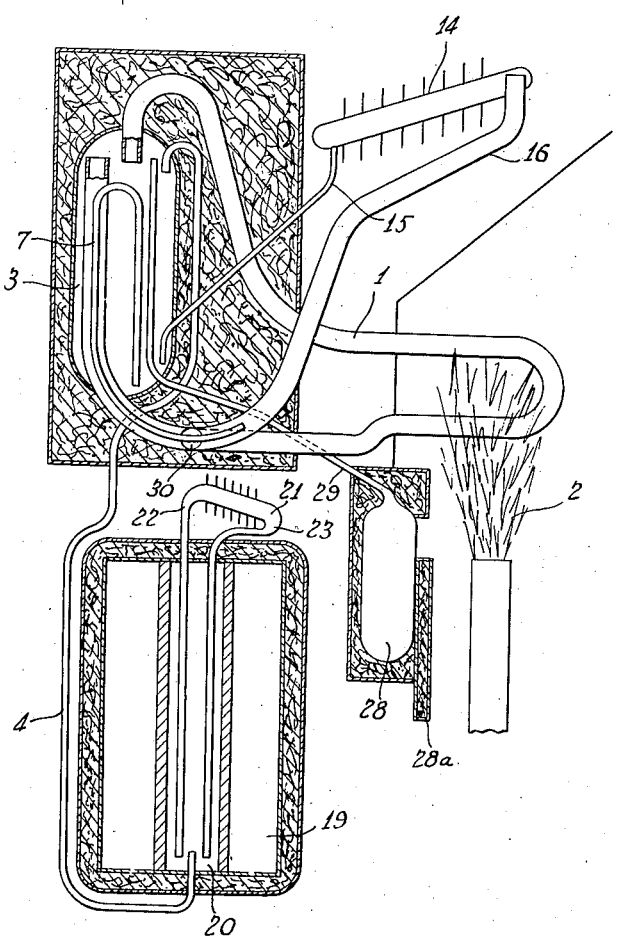

On the accompanying drawings some embodiments of the invention are shown diagrammatically. Fig. 1 shows a vertical section of the invention as applied to a device for heating liquid. Fig. 2 shows a part of the device according to Fig. 1, but somewhat modified. Figures 3 and 4 show two different embodiments of the invention applied to intermittently operating absorption-refrigerating machines.

In the embodiment shown in Fig. 1 reference numeral 1 indicates a heat absorbing part, executed in the shape of a pipe coil, receiving heat from a continuous source of heat. The left leg of heat absorbing part 1 is open at the top so as to communicate with the upper part of a receptacle 3, to the top of which is connected one end of a comparatively small bore pipe 4, the other end of which is connected with the lower part of a condensate collector 5, which in its turn is connected with a condenser 6. The receptacle 3 is provided with a suction siphon 7, opening into the heat absorbing part 1, so that the receptacle 3, after a certain quantity of liquid has been collected, is emptied by means of the siphon 7. The receptacle 3 is surrounded by an insulating covering 8, with the exception of one point, where an air duct 9 is in contact with the outside wall of the receptacle. The area of passage through the duct 9 is adjustable by means of a throttle 10. The condenser 6 is surrounded by a water tank 11, forming part of a water heating system, having inlet and outlet connections, 11a and 11b. The condenser 6 is connected with the condensate collector 5 by means of a piece of pipe 12, ending near the bottom of the condensate collector. The condensate collector 5 is surrounded by a heat accumulator 13. The heat absorbing capacity of the condenser 6 and the tank of water 11 is substantially greater than that of the receptacle 3.

The system described here is only partly filled with a vaporizable heat transmitting medium. Absorbing heat from the heat source 2, this medium vaporizes, flows through the pipe 4 to the condenser 6 where it condenses, giving off heat to the water in the tank 11, and finally in the state of condensate is gathered in the condensate collector 5. Vapour coming from the pipe 4 will thus bubble through the condensate and through the pipe 12 go on up to the condenser 6. Simultaneously, the condensate in the condensate collector 5 is heated a little, whereas the vapour, that may escape from the upper surface of the condensate outside the small pipe 12, cannot pass away to the condenser but is kept in the condensate collector, giving off heat to the accumulator 13. After the liquid contained in the heat absorbing part 1 has vaporized, so that the vapour pressure is not able to rise substantially higher in this part, the heat transmitting medium can no longer flow over to the condenser. As the receptacle 3, owing to the existence of the duct 9, is subject to a certain degree of cooling, the vapour pressure in the receptacle 3 and the heat absorbing part 1 will decrease and consequently, the higher pressure in the condenser 6 and the condensate collector 5, ensured by the existence of the heat accumulator, will force the condensate from the condensate collector through the pipe 4 to the receptacle 3. From there, however, the condensate cannot flow back to the heat absorbing part 1, until condensate has been collected in the receptacle 3 in such a quantity that it is able to escape through the siphon 7. Then practically the whole quantity of condensate collected in the receptacle passes away to the heat absorbing part, whereupon the transmission of heat to the condenser 6 is recommenced and the process described above is repeated.

Heat is thus intermittently supplied to the heat consuming part, but if the system is proportioned so that comparatively short intervals between the heat supply periods are obtained, the heat supply may be considered substantially continuous. Owing to the change in the cooling of the receptacle 3, effected by means of the throttle 10, it is also possible to change the frequency, at which the apparatus works.

The embodiment shown in Figure 2 differs from the one as shown in Figure 1 mainly with regard to the arrangement made for cooling the receptacle 3. The details shown in Figure 2 which correspond to details shown in Figure 1, are given the same reference characters as in Fig. 1. The pipe 4, partly shown, is intended to be connected with a heat consuming apparatus, as shown in Fig. 1. By means of a condensate conduit 15, opening into the receptacle 3 in a lower plane than the siphon 7, a cooler 14 is connected to the lower part of the receptacle 3. The upper part of the cooler 14 is connected to the lower part of the heat absorbing part 1 by means of a vapour conduit 16. The cooler 14, which is provided with cooling flanges, is placed in the air duct 17, the area of passage of which is adjustable by means of a throttle 18.

As the lower end of the condensate pipe 15, as mentioned above, is constantly submerged in liquid, retained in the bottom of the receptacle 3, no flow of vapour can take place from the heat absorbing part 1 through the condensate pipe 15 to the cooler 14. Furthermore, as the vapor conduit 16 ends in the lowest part of the heat absorbing part 1, flow of vapour from the heat absorbing part through the vapour conduit to the cooler 14 takes place only after vaporization of essentially all the liquid heat transmitting medium, introduced into the heat absorbing part. The consequence of this is, that the cooler 14 starts functioning first after the predetermined transfer of vapour to the condenser has been effected, whereupon it acts to decrease the pressure in the receptacle 3 and the heat absorbing part, so as to enable the vapour pressure in the condenser 6 to effect the transfer of condensate to the receptacle 3. After liquid has been returned to the heat absorbing part 1 through the siphon 7, the lower end of pipe 16 is filled with liquid which prevents further flow of vapour to cooler 14 and the cooling of the receptacle 3 stops. Thus, no appreciable heat loss takes place during the periods of vapour transfer to the condenser. By regulating the air flow through the duct 17, it is also possible to control the cooling effect of the cooler 14 and consequently also the frequency of the heat transmission.

In the embodiment of the invention shown in Figure 3 the apparatus according to the invention is connected with an intermittently operating absorption-refrigerating machine, of which only the boiler-absorber 19 is shown on the drawing. At a short distance from the bottom of the boiler-absorber 19 the pipe 4 opens into a primary condenser 20 of high heating capacity and good heat conductive power. To the primary condenser 20 is connected a secondary condenser 21, the vapour conduit 22 and the condensating pipe 23 of which open into the primary condenser 20 at a short distance from the bottom of same and slightly above the inlet opening of the pipe 4 in the primary condenser 20. In this way it is possible to make sure that vapour from the primary condenser is allowed to condense in the secondary condenser, only after the surface of the condensate in the primary condenser has sunk to a certain level. By means of the pipes 15 and 16 the cooler 14 is connected with the receptacle 3 and is arranged in such a way that it is situated below the highest level D of the heat transmitting medium in the receptacle 3. To the top of the cooler is connected a vessel 24, in which the vapour conduit 16 projects to such a height that its upper opening is situated above the said level D. This means that the vapour conduit 16, the cooler 14 and the condensate pipe 15 are not allowed to start functioning in order to empty the receptacle 3, before the siphon 7 starts functioning. The part 24 of the cooler 14 is surrounded by a displaceable insulating covering 25 so that the cooling of the said part can be controlled. In order to stop the transfer of heat to the boiler-absorber 19 when a maximum desired temperature of the latter has been reached, the receptacle 3 may be in communication with an expansion vessel 26, which is kept at about the same temperature as the maximum desired in the boiler-absorber 19, which vessel collects heat transmitting medium so as to stop the circulation in the system, when the system has reached the desired values of pressure and temperature.

The heat transmitting medium, vaporized in the heat absorbing part 1, passes through the pipe 4 to the primary condenser 20, where it condenses, emitting heat to the primary condenser and thus also to the boiler-absorber 19, until the condenser 20 is filled with condensate to a certain level. When the level of the heat transmitting medium in the heat absorbing part 1 has sunk below the bottom end of the pipe 16, vapour starts flowing into the cooler 14 through the said pipe, so that the cooler starts functioning, whereupon the heat transmitting medium condensed in the cooler passes away to the receptacle 3 through the condensate pipe 15. In this way, condensate is only allowed to be collected in the receptacle 3 in such a quantity that the surface of the condensate is below the level, indicated by B on the drawings, which means that the condensate does not reach up in the cooler 14. When the cooler 14 is functioning, the vapour pressure in the cylinder 3 decreases and when it is below the vapour pressure in the primary condenser 20, the latter vapour pressure will be able to force condensate from the condenser 20 through the pipe 4 to the receptacle 3, in which the surface of the condensate rises until the level, indicated by the letter C, is reached, whereas the condensate in the condenser 20 has sunk to the opening of the pipe 4 in the condenser 20, so that no further condensate can pass away from there in the state of liquid, the remainder of the condensate being retained in the primary condenser 20. When thus the condensate level in the primary condenser 20 has sunk below the lower ends of the pipes 22 and 23, vapour is admitted to the secondary condenser 21, producing a cooling effect upon the boiler-absorber 19. Owing to the passing away of the condensate contained in the pipe 4 to the receptacle 3, and the following transfer of vapour through the pipe 4 and the condensation taking place in the top part 24 of the cooler 14, the level of the condensate in the cylinder 3 rises to the level, indicated by the letter D, whereupon the siphon 7 starts functioning, emptying the contents of the receptacle 3 into the heat absorbing part 1. The pressure in the receptacle 3 increases again so that the transfer of vapour to the primary condenser is resumed and the same process is repeated. By displacing the insulating cover 25, the cooling effect of the cooler may be changed, so that the level D is reached earlier or later. In this way, the interval between two consecutive heat transmitting periods can be reduced or prolonged in a corresponding degree. The system can be provided with an expansion vessel 26, connected to same, and which is kept at the maximum temperature desired in the primary condenser 20, so as to make sure that a sufficient quantity of heat transmitting medium is transferred to the expansion vessel in order to bring the circulation in the system to stop when said temperature is exceeded.

In the embodiment shown in Figure 4 the lower ends of the pipes 22 and 23 of the secondary condenser 21 which open into the primary condenser 20, are situated in a lower plane than the open end of the pipe 4 in the primary condenser. The cooler 14 is situated higher than the highest liquid level in the receptacle 3, and the vapour conduit 16, which is comparatively wide, is at its lower end connected with the lowest part of the heat absorbing part 1 through an opening 30. A variable area of an expansion vessel 28 may be directly exposed to heat from the heat source 2 by virtue of a movable section 28a of insulation, but is otherwise insulated against heat. By means of a conduit 29 the top of the expansion vessel 23 is connected to the upper part of the receptacle 3 and should preferably reach above the highest liquid level in the receptacle 3.

In the same manner as described above in connection with Figures 1 and 2, the heat transmitting medium will alternately be transmitted to the primary condenser 20 in the state of vapour and be forced from there to the receptacle 3 in the state of liquid. Thereby the temperature of the boiler-absorber 10 and consequently the pressure in the system will be increased. When a certain temperature and hence pressure is reached, heat transmitting medium starts to condense in the expansion vessel 28. The pressure at which condensation commences in the vessel 28 is determined by the temperature at which this vessel is maintained by the movable section of insulation 28a. This section is so adjusted as to maintain the vessel 28 at a temperature substantially equal to the maximum temperature which should exist in the boiler-absorber 12 at the end of each heating period of the refrigerating apparatus. Condensation in the vessel 28 causes the level of the liquid in the receptacle 3 to reach such a slight height that the heat transmitting medium can not pass away through the siphon 7. The current of heat transmitting medium between the condenser 20 and the receptacle 3 hence will be interrupted. After the last heat transmitting period the liquid level in the condenser 20 has sunk to the open end of the pipe 4 within the condenser, whereupon this pipe has been emptied of liquid. Some of the heat transmitting medium, previously condensed in the condenser 20, evaporates and flows through pipe 4 to the receptacle 3 and the cooler 14 in the state of vapour. When the level has sunk below the lower ends of the pipes 22 and 23 a cooling effect upon the boiler-absorber is produced by vapour being admitted to the secondary condenser 21, where it condenses and flows back to the condenser 20. After the boiler-absorber as well as the condenser 20 has been cooled down to a certain degree, constituting an absorption period in the refrigerating system the pressure in the heat transfer system decreased, and the heat transmitting medium in the expansion vessel 28 vaporizes and passes on to the receptacle 3, gathering there in the state of liquid. In this way, the liquid level in the receptacle 3 will finally reach such a height that the siphon 7 starts functioning again. Thereafter the operations are continued as usual a certain number of times until the boiler-absorber has regained its maximum temperature, whereupon the process described above is repeated. The boiler-absorber is thus first heated during a plurality of heat transfer periods of the heat transfer system and then is cooled down during the relatively long period required to vaporize the liquid which has condensed in vessel 28, and during which long period no heat transfer takes place. In this way the boiler-absorber is alternately heated and cooled in order to operate the intermittent refrigerating machine, not shown.

The invention should not be considered as limited to the embodiments described and shown on the accompanying drawings, as these embodiments may be varied in several ways within the scope of the invention. The throttle 10, 13 may be thermostatically controlled so as to automatically regulate the cooling effect. The water cistern 11 may be replaced by any other heat consuming device. A condensate collector may also be provided at the condensers shown in Figures 3 and 4.

Having now particularly described and ascertained the nature of my said invention and in what manner the same is to be performed, I declare that what I claim is:

1. In a system for transmitting heat by a vaporizable liquid, a receptacle, a conduit forming a circulatory path for fluid, means for heating said conduit, said conduit being in communication with the upper part of said receptacle whereby vapor produced in the conduit flows into the receptacle, a condenser in heat exchange relation with a member to be heated, a conduit connecting the lower part of said condenser with said receptacle, a syphon having its lower end communicating with the first mentioned conduit and its higher end communicating with the lower part of said receptacle, and means for cooling said receptacle at a faster rate when substantially all the fluid has been expelled from said first mentioned conduit than at other periods.

2. A system as defined in claim 1 in which the condenser and member to be heated together have a heat absorbing capacity substantially higher than that of said receptacle.

3. In a system for transmitting heat by a vaporizable liquid, a receptacle, a conduit forming a circulatory path for fluid, means for heating said conduit, said conduit being in communication with the upper part of said receptacle whereby vapor produced in the conduit flows into the receptacle, a condensate collector, a conduit connecting the lower part of said collector with said receptacle, a condenser in heat exchange relation with an object to be heated and extending into the lower part of said collector and having an open end disposed directly above the end of the last mentioned conduit, whereby vapor emitted from said last mentioned conduit will bubble through condensate in said collector and enter said condenser, a syphon having its lower end communicating with the first mentioned conduit and its higher end communicating with the lower part of said receptacle, and means for cooling said receptacle at a faster rate when substantially all the fluid has been expelled from said first mentioned conduit than at other periods.

4. In a system for transmitting heat by a vaporizable liquid, a receptacle, a conduit forming a circulatory path for fluid, means for heating said conduit, said conduit being in communication with the upper part of said receptacle whereby vapor produced in the conduit flows into the receptacle, a condenser in heat exchange relation with a member to be heated, a conduit connecting the lower part of said condenser with said receptacle, a syphon having its lower end communicating with the first-mentioned conduit and its higher end communicating with the lower part of said receptacle, means for dissipating heat from said receptacle at a faster rate when substantially all the fluid has been expelled from said first mentioned conduit than at other periods, and means for varying the rate at which the last-mentioned means dissipates heat.

5. In a system for transmitting heat by a vaporizable liquid, a receptacle, a conduit forming a circulatory path for fluid, means for heating said conduit, said conduit being in communication with the upper part of said receptacle whereby vapor produced in the conduit flows into the receptacle, a condenser in heat exchange relation with a member to be heated, a conduit connecting the lower part of said condenser with said receptacle, a syphon having its lower end communicating with the first-mentioned conduit and its higher end communicating with the lower part of said receptacle, a heat dissipating vessel, a condensate conduit connecting the lower part of said vessel with the lower part of said receptacle, and a vapor conduit connecting the lower part of said first-mentioned conduit with said vessel above the lower part thereof.

6. In a system for transmitting heat by a vaporizable liquid, a receptacle, a conduit forming a circulatory path for fluid, means for heating a lower portion of said conduit, said conduit being in communication with the upper part of said receptacle whereby vapor produced in the conduit flows into the receptacle, a condenser in heat exchange relation with a member to be heated, a conduit connecting the lower part of said condenser with said receptacle, a syphon having its lower end communicating with the first mentioned conduit and its higher end communicating with the lower part of said receptacle, means for cooling said receptacle at a faster rate when substantially all the fluid has been expelled from said first-mentioned conduit than at other periods, an expansion vessel subjected to substantially the same temperature as the desired temperature of said member to be heated, and a conduit connecting said vessel with said receptacle.

7. In combination with an intermittent absorption refrigerating apparatus having a boiler-absorber, a system for intermittent transmitting heat to said boiler-absorber by a vaporizable liquid including a receptacle, a conduit forming a circulatory path for fluid, means for heating said conduit, said conduit being in communication with the upper part of said receptacle whereby vapor produced in the conduit flows into the receptacle, a condenser in heat exchange relation with said boiler-absorber, a conduit connecting the lower part of said condenser with said receptacle, a syphon having its lower end communicating with the first-mentioned conduit and its higher end communicating with the lower part of said receptacle, and means for cooling said receptacle at a faster rate when substantially all the fluid has been expelled from said first-mentioned conduit than at other periods 8. In combination with an intermittent absorption refrigerating apparatus having a boiler-absorber, a system for intermittently transmitting heat to said boiler-absorber by a vaporizable liquid including a receptacle, a conduit forming a circulatory path for fluid, means for heating said conduit, said conduit being in communication with the upper part of said receptacle whereby vapor produced in the conduit flows into the receptacle, a primary condenser in heat exchange relation with said boiler-absorber, a conduit connecting the lower part of said condenser with said receptacle, a secondary condenser connected to the lower part of said primary condenser whereby vapor may enter said secondary condenser only when the level of condensate in said primary condenser is below a predetermined level, a syphon having its lower end communicating with the first-mentioned conduit and its higher end communicating with the lower part of said receptacle, and means for cooling said receptacle at a faster rate when substantially all the fluid has been expelled from said first-mentioned conduit than at other periods.

9. In combination with an intermittent absorption refrigerating apparatus having a boiler-absorber, a system for intermittently transmitting heat to said boiler-absorber by a vaporizable liquid including a receptacle, a conduit forming a circulatory path for fluid, means for heating said conduit, said conduit being in communication with the upper part of said receptacle whereby vapor produced in the conduit flows into the receptacle, a primary condenser in heat exchange relation with said boiler-absorber, a conduit connected to said receptacle and communicating with said primary condenser at a point above the bottom of the latter, a secondary condenser connected to said primary condenser slightly above said point, a syphon having its lower end communicating with the first-mentioned conduit and its higher end communicating with the lower part of said receptacle, and means for cooling said receptacle at a faster rate when substantially all the fluid has been expelled from said first-mentioned conduit than at other periods.

10. In combination with an intermittent absorption refrigerating apparatus having a boiler-absorber, a system for intermittently transmitting heat to said boiler-absorber by a vaporizable liquid including a receptacle, a conduit forming a circulatory path for fluid, means for heating said conduit, said conduit being in communication with the upper part of said receptacle whereby vapor produced in the conduit flows into the receptacle, a condenser in heat exchange relation with said boiler-absorber, a conduit connecting the lower part of said condenser with said receptacle, a syphon having its lower end communicating with the first-mentioned conduit and its higher end communicating with the lower part of said receptacle, a heat dissipating vessel disposed chiefly below the highest point of said syphon, a condensate conduit connecting the lower part of said vessel with the lower part of said receptacle, and a vapor conduit connecting the lower part of said first-mentioned conduit with said vessel above the lower part thereof.

11. A system as defined in claim 10 including means for varying the rate of heat dissipation from said vessel.

12. In combination with an intermittent absorption refrigerating apparatus having a boiler-absorber, a system for intermittently transmitting heat to said boiler-absorber by a vaporizable liquid including a receptacle, a conduit forming a circulatory path for fluid, means for heating said conduit, said conduit being in communication with the upper part of said receptacle whereby vapor produced in the conduit flows into the receptacle, a primary condenser in heat exchange relation with said boiler-absorber, a conduit connected to said receptacle and communicating with said primary condenser at a point above the bottom of the latter, a secondary condenser connected to said primary condenser below said point, a syphon having its lower end communicating with the first-mentioned conduit and its higher end communicating with the lower part of said receptacle, means for cooling said receptacle at a faster rate when substantially all the fluid has been expelled from said first-mentioned conduit than at other periods, an expansion vessel, means for maintaining said expansion vessel at substantially the same temperature as the maximum temperature to which said boiler-absorber is to be heated and a conduit connecting the upper part of said expansion vessel with the upper part of said receptacle.

PER ANTON ÅSTRADSSON.